UNITED STATES PATENT OFFICE.

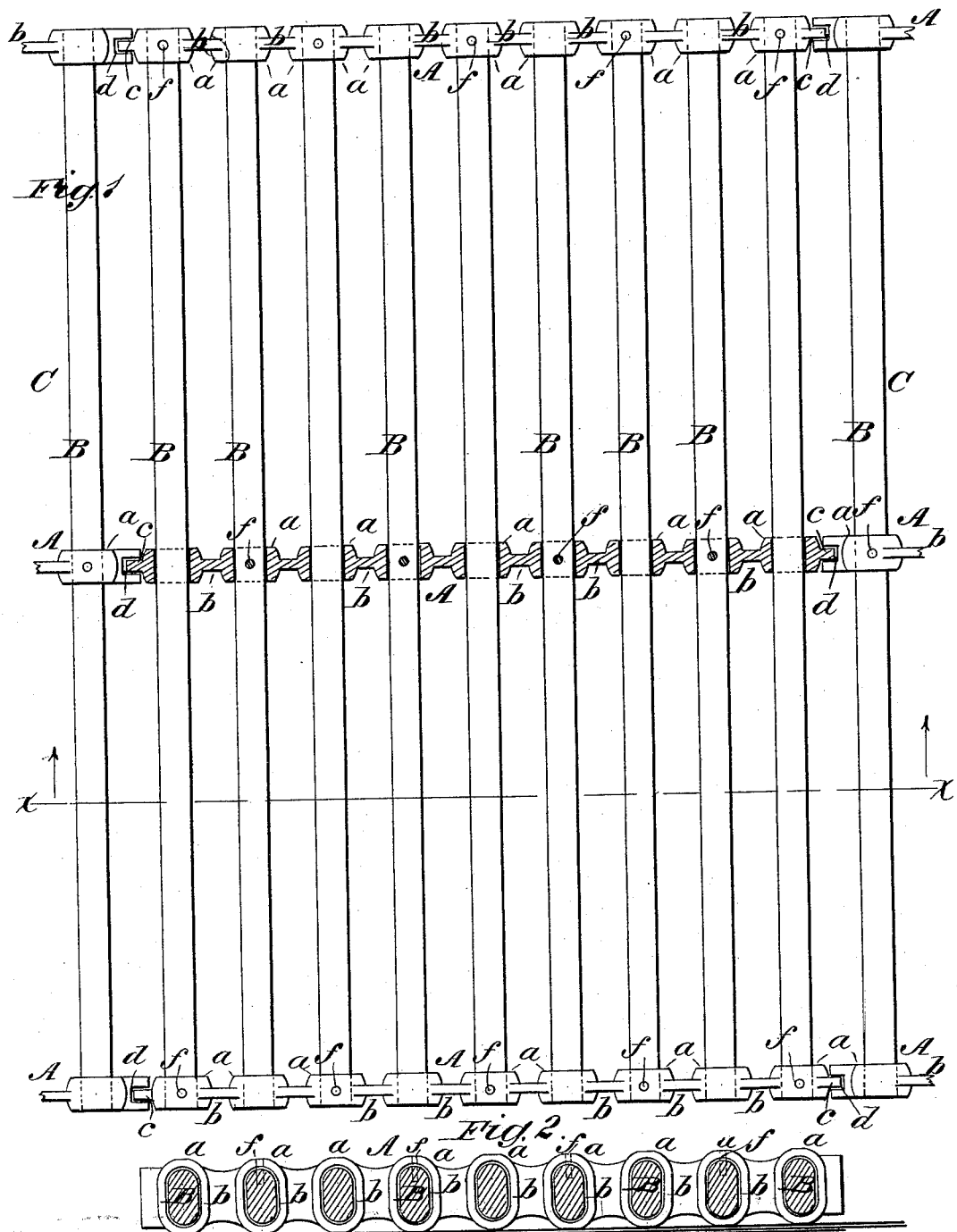

JOHN H. ROBERTSON, OF NEW YORK, N. Y.

MAT.

SPECIFICATION forming part of Letters Patent No. 232,760, dated September 28, 1880.

Application filed August 11, 1880. (No model.)

*To all whom it may concern:*

Be it known that I, JOHN H. ROBERTSON, of the city, county, and State of New York, have invented a new and Improved Mat, of which the following is a specification.

The object of this invention is to provide a more rigid, strong, and durable mat, especially designed for floors of cars.

The invention consists of longitudinal metal bars provided with alternate mortised and tenoned ends, and composed of series of sockets united by webs and of wooden transverse rods entered through said sockets and held therein by vertical pins.

Figure 1 is a plan of the mat, partly in section. Fig. 2 is a cross-section of the same on line $x\ x$, Fig. 1.

Similar letters of reference indicate corresponding parts.

In the drawings, A A represent the longitudinal metal bars, composed of alternate sockets $a\ a$, united by alternate webs $b\ b$, each bar A having a tenon, $c$, on one end and a bifurcated mortise, $d$, on the opposite end, to fit into corresponding tenons and mortises in similar bars A when more than one mat or mat-sections are designed to be formed into one.

B B are the transverse wooden rods entered through the sockets $a\ a$ and held therein by pins $f\ f$.

Ordinarily the mats are constructed, as herein shown, with three bars, A, placed parallel with each other at equal distances apart, and the parallel wooden rods B B, passed entirely through the sockets of the central bar A and into the sockets of the side bars A A, so that the ends of the rods B B shall be flush with the outer edges of said sockets $a\ a$.

C C in the drawings, Fig. 1, represent portions of like mats, showing the manner in which the mats or mat-sections are laid together.

Mats in some respects resembling mine have been constructed in which the wooden rods are held by metal rods passing through them and kept at suitable distances apart by wooden washers set on the metal rods between the wooden rods. A mat so constructed is, however, liable to distortion from the bending of the metal rods and breaking of the wooden washers, and the wooden rods are greatly weakened by the holes through which the metal rods pass. In this device these objections are avoided.

Having thus described my invention, I claim as new and desire to secure by Letters Patent—

1. As an improved manufacture, a mat constructed substantially as herein shown and described, consisting of the metal bars A A, composed of alternate sockets $a\ a$ and webs $b\ b$, and transverse wooden rods B B, as set forth.

2. In a mat, the bars A A, composed of alternate sockets $a\ a$, held rigidly together by webs $b\ b$, substantially as herein shown and described.

JOHN H. ROBERTSON.

Witnesses:
JOHN LAPPIN,
JOSEPH E. STEGER.